(12) United States Patent
Baas et al.

(10) Patent No.: US 9,045,981 B2
(45) Date of Patent: Jun. 2, 2015

(54) TELESCOPIC SAFETY DEVICE

(75) Inventors: Fred Baas, Nieuw Vennep (NL); Jan Pieter Maarschalk, Amsterdam (NL)

(73) Assignee: RESQTEC-ZUMRO B.V., Lisse (NL)

( * ) Notice: Subject to any disclaimer, the term of this patent is extended or adjusted under 35 U.S.C. 154(b) by 221 days.

(21) Appl. No.: 13/805,792

(22) PCT Filed: Jun. 21, 2011

(86) PCT No.: PCT/NL2011/050447
§ 371 (c)(1),
(2), (4) Date: Jan. 31, 2013

(87) PCT Pub. No.: WO2012/005571
PCT Pub. Date: Jan. 12, 2012

(65) Prior Publication Data
US 2013/0126695 A1    May 23, 2013

(30) Foreign Application Priority Data

Jun. 21, 2010    (NL) ..................................... 2004931

(51) Int. Cl.
| F16M 13/00 | (2006.01) |
| --- | --- |
| E21D 15/44 | (2006.01) |
| E04G 25/08 | (2006.01) |
| F16B 7/14 | (2006.01) |
| E21D 15/14 | (2006.01) |
| A62B 3/00 | (2006.01) |

(52) U.S. Cl.
CPC . E21D 15/44 (2013.01); A62B 3/00 (2013.01); E04G 25/08 (2013.01); F16B 7/1409 (2013.01); E21D 15/14 (2013.01)

(58) Field of Classification Search
USPC ........ 248/351, 354.4, 354.5, 354.6, 357, 694, 248/688, 511, 125.8, 121, 127, 157, 423; 403/109.1, 109.6, 13, 365, 108, 109.2, 403/109.5; 108/147.13, 147.15, 131, 108/147.11; 211/181.1, 187
See application file for complete search history.

(56) References Cited

U.S. PATENT DOCUMENTS

| 2,461,915 A | * | 2/1949 | Neuwirth ................... 248/188.5 |
| 2,838,266 A | * | 6/1958 | Rees ........................... 248/354.1 |
| 3,871,780 A | * | 3/1975 | Svensson ...................... 403/104 |

(Continued)

FOREIGN PATENT DOCUMENTS

| BE | 489 789 A | 6/1949 |
| EP | 0 156 575 A2 | 10/1985 |

(Continued)

OTHER PUBLICATIONS

International Search Report, dated Nov. 4, 2011, from corresponding PCT application.

*Primary Examiner* — Monica Millner
(74) *Attorney, Agent, or Firm* — Young & Thompson

(57) ABSTRACT

A safety device 1 includes a telescopic tubular body 2 with an axial space which is bounded by an outer casing 3 and through which an extending part 4 is axially movable. The outer casing 3 and the extending part 4 are adjustable relative to each other between a relatively compact starting position and at least one extended position. At least one blocking body 7 is provided in the space between the outer casing 3 and the extending part 4 which blocks a movement of the extending part 4 into the outer casing 3, while the at least one blocking body 7 allows a reverse movement of the extending part out of the outer casing.

12 Claims, 3 Drawing Sheets

(56) References Cited

U.S. PATENT DOCUMENTS

| | | | | |
|---|---|---|---|---|
| 3,991,964 | A * | 11/1976 | Christopher | 248/354.1 |
| 4,099,602 | A * | 7/1978 | Kourbetsos | 188/300 |
| 4,280,341 | A * | 7/1981 | Krude | 464/167 |
| 4,684,098 | A * | 8/1987 | Lamond et al. | 248/407 |
| 5,205,676 | A * | 4/1993 | Heiliger | 405/290 |
| 5,366,313 | A * | 11/1994 | LaBarre | 403/108 |
| 5,400,995 | A * | 3/1995 | Boyd | 248/414 |
| 5,924,658 | A * | 7/1999 | Shiery et al. | 248/125.8 |
| 6,299,113 | B1 * | 10/2001 | Yamashita et al. | 248/161 |
| 6,394,405 | B1 * | 5/2002 | Roxton et al. | 248/354.1 |
| 6,609,686 | B2 * | 8/2003 | Malizia | 248/125.8 |
| 7,914,238 | B2 * | 3/2011 | Spearing et al. | 405/288 |
| 8,092,121 | B2 * | 1/2012 | Spearing et al. | 405/288 |
| 8,137,243 | B2 * | 3/2012 | Coote | 482/51 |
| 8,162,558 | B2 * | 4/2012 | Warner | 403/109.1 |
| 8,381,611 | B2 * | 2/2013 | Schindler et al. | 74/493 |
| 8,820,693 | B1 * | 9/2014 | Young et al. | 248/412 |
| 2009/0121110 | A1 * | 5/2009 | Fabbri | 248/354.1 |

FOREIGN PATENT DOCUMENTS

| | | |
|---|---|---|
| EP | 1 080 665 A1 | 3/2001 |
| FR | 560 491 A | 10/1923 |

* cited by examiner

TELESCOPIC SAFETY DEVICE

BACKGROUND OF THE INVENTION

1. Field of the Invention

The present invention relates to a safety device, in particular a safety strut, for safely supporting a relatively heavy load, comprising a telescopic tubular body with an axial space which is bounded by an outer casing and through which an extending part is axially movable, wherein the tubular body is adjustable between a relatively compact starting position, in which the extending part is located at least substantially wholly inside the outer casing, and at least one extended position in which the extending part extends for at least a substantially greater part outside the outer casing, and comprising fixation means for fixing the extending part and the outer casing relative to each other in the at least one extended position.

2. Description of the Related Art

Such a safety device, and in particular safety strut, is usually applied for the purpose of stabilizing a possibly unstable and relatively heavy load in emergency situations so that people operating in the vicinity of the load, such as safety staff, are not at risk of being hurt or more seriously injured due to the load tipping or falling over unexpectedly. Known safety devices make use of a tubular body having at a first outer end a support element for supporting therewith on a ground surface and at an opposite second outer end a further support element for supporting the load to be stabilized. A distance between the load to be stabilized and the ground surface can vary from case to case. In order to avoid a safety device of specific length being necessary, many known safety devices thus comprise a telescopic tubular body with an axial space which is bounded by an outer casing and through which an extending part is axially movable, so that the tubular body can be set between a relatively compact starting position and at least one extended position. It is important for safety devices that a safety device, once it has been placed to support the load, cannot move in undesired manner to the compact starting position with the consequence of possible damage and/or personal injury. Known safety devices are usually provided for this purpose with fixation means in the form of fixation pins which are inserted through openings arranged in the outer casing so as to penetrate into the space and fix the extending part and the outer casing relative to each other in the at least one extended position.

Although the known device thus prevents an unexpected movement to the compact starting position, it does however also have a number of drawbacks. Insertion of the fixation pins through the openings in particular requires an operation by a user of the safety device, who is therefore in the vicinity of the possibly unstable load for a longer time and so runs a greater risk.

BRIEF SUMMARY OF THE INVENTION

The present invention thus has for its object, among others, to provide a safety device of the type stated in the preamble which obviates this stated drawback.

In order to achieve the intended object, a safety device of the type stated in the preamble has the feature according to invention that the fixation means comprise at least one blocking body which is provided in the space between the outer casing and the extending part in a recess gradually increasing in depth in axial direction on a main surface adjoining the space, wherein at least in the at least one extended position the at least one blocking body clamps in a shallow part of the recess between a main surface of the outer casing and a main surface of the extending part in order to block at least a movement of the extending part into the space inside the outer casing, and wherein after being driven the at least one blocking body is displaceable into a deeper part of the recess to enable free setting of the outer casing and the extending part relative to each other. By providing the blocking body in the tubular body a movement of the extending part into the outer casing is blocked. The blocking is a result of the clamping of the blocking body in a shallow part of the recess between the extending part and the outer casing, wherein a relatively high frictional resistance occurs between the blocking body and the main surfaces of the extending part and the outer casing. It is the case here that, as there is increasing pressure on the extending part and the outer casing to move to the starting position, for instance in the case a relatively heavy load is being supported, the frictional resistance also increases. The safety device thus blocks automatically, and no operation is required for this purpose by a user of the safety device. The risk to the user in placing the safety device under a load is thus considerably limited. On the other hand the safety device according to the present invention is however easily adjustable to a further extended position in that the blocking body can be displaced to the recess increasing in depth, wherein the blocking body no longer has any contact, or hardly any, with the main surface lying opposite the recess. The opposite main surface is hereby no longer subject to frictional resistance and the outer casing and the extending part can be moved freely relative to each other in an extending direction. It is not important for the occurrence of the necessary friction forces whether the main surface lying opposite the recess is rough or uneven. Since the blocking body moves into a deeper part of the recess for possible release of a blocking, an embodiment of the main surface lying opposite the recess is not of particular importance. The main surface opposite the recess can thus very well take an at least substantially flat form. Neither the extending part nor the outer casing need therefore be preprocessed in order to be suitable for use in the safety device according to the present invention.

Owing to the blocking body the safety device according to the present invention is moreover continuously adjustable to any extended position between the starting position and a maximum extended position. Irrespective of how far the extending part is extended relative to the outer casing, the at least one blocking body will prevent an undesired movement of the extending part into the outer casing.

A preferred embodiment of a safety device according to the present invention has the feature that the recess deepens at an angle of between at least substantially 1 and at least substantially 45 degrees relative to the main surface adjoining the space. With such an angle there occurs no or hardly any slippage of the at least one blocking body between the main surfaces.

Although it is possible according to the present inventive concept to provide the recess on an inner side of the outer casing facing toward the space, so that the extending part can be given an at least substantially flat form on an outer side facing toward the space, it is simpler for the purpose of manufacture of the safety device to provide the at least one blocking body in a recess on the outer side of the extending part facing toward the space. This is because the outer side is more readily accessible than the inner side of the outer casing, so that the at least one blocking body can be arranged more easily in the recess. With the at least one blocking body in the recess the outer casing can then simply be pushed over the extending part in order to enclose the at least one blocking body in the recess between the outer casing and the extending part. In a further preferred embodiment a safety device according to the present invention is thus characterized in that the recess is provided on an outer side of the extending part facing toward the space.

A further preferred embodiment of a safety device according to the present invention has the feature that the extending part is provided with the recess at least close to an outer end inside the space. The extending part can thus be extended over substantially a full length thereof from the outer casing without the risk of the blocking body detaching from the outer casing.

In a particular embodiment a safety device according to the present invention is characterized in that the recess is a groove which extends radially and in which a number of blocking bodies are provided all around. By making use of a groove with more than one blocking body all the way around therein a clamping force is distributed over the plurality of blocking bodies. In order to enable application of still more locking means a safety device according to the present invention is characterized in a further particular embodiment thereof in that there are in the axial direction a number of successive grooves in which a number of further blocking bodies are provided.

In a further preferred embodiment a safety device according to the present invention is characterized in that inside the cylinder space a pushing body is provided which pushes the at least one blocking body under spring tension into the shallow part of the recess. The at least one blocking body is thus urged continuously under spring tension into the clamping position between the outer casing and the extending part for a reliable fixation of the tubular body. The at least one blocking body can thus be forced out of the clamping position only counter to the spring tension. Because as a result the at least one blocking body moreover cannot escape automatically from the clamping position, the safety device is therefore position-insensitive, i.e. the safety device can be used with a one outer end downward as well as with an opposite other outer end downward.

In order to release fixation of the tubular body a safety device according to the present invention is characterized in a further preferred embodiment in that the extending part is provided with an axial cavity inside which a drive rod is provided which is coupled at an outer end close to the at least one blocking body to a drive member which is able and adapted to drive the at least one blocking body out of the shallow part of the recess into a deeper part of the recess.

In a further preferred embodiment a safety device according to the present invention is characterized in that between successive blocking bodies in the successive grooves a connecting body is provided which connects the blocking bodies to each other. The successive blocking bodies in axial direction hereby drive each other. Only a lower blocking body need thus be driven in order to move all blocking bodies simultaneously between a shallow part of the recess and a deeper part of the recess for the purpose of fixing or, conversely, releasing the tubular body.

In a further preferred embodiment a safety device according to the present invention is characterized in that the tubular body can be adjusted manually, hydraulically and/or pneumatically between the starting position and the at least one extended position. As the case requires, it is thus possible to opt for a manual controllable safety device or a safety device controlled more automatically by means of air pressure or liquid pressure. Particularly when use is made of a hydraulic or pneumatic safety device, an additional advantage is that the device can be remotely controlled. A user of the device can hereby stay a sufficient distance from a load to be supported which is possibly unstable, so that the user runs no risk whatever.

In a further preferred embodiment a safety device according to the present invention has the feature that the space inside the tubular body is at least substantially dirt and dust-tight. Preventing penetration of dirt and dust into the space between the outer casing and the extending part in this way enhances the durability and reliability of the safety device.

BRIEF DESCRIPTION OF THE DRAWINGS

The invention will now be further elucidated on the basis of an exemplary embodiment and an accompanying drawing. In the drawing.

Figure 1A:
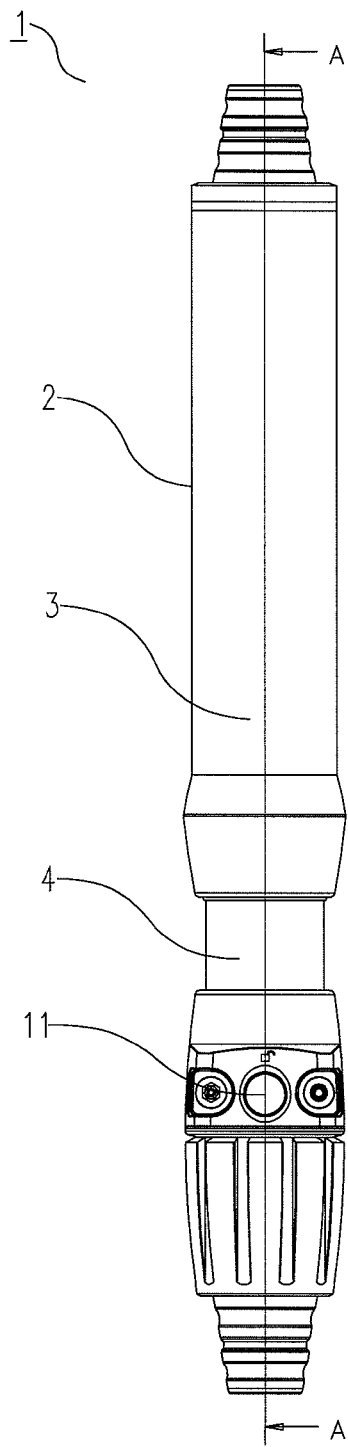
FIG. 1A is a front view of an exemplary embodiment of a safety device according to the invention.

The figures are otherwise substantially schematic and not drawn to scale. Some dimensions in particular may be shown exaggerated to a greater or lesser extent for the sake of clarity.

Corresponding parts are designated as far as possible in the figures with the same reference numerals.

DETAILED DESCRIPTION OF THE PREFERRED EMBODIMENTS

As shown in FIG. 1A in an exemplary embodiment, safety device 1 according to the invention comprises a telescopic tubular body 2 in the form of a cylinder with an axial space which is bounded by an outer casing 3 and through which a piston rod 4 is axially movable as extending part. Cylinder 2 is adjustable between a relatively compact starting position, in which piston rod 4 is situated at least substantially wholly inside outer casing 3 as shown in FIG. 1A, and at least one extended position in which piston rod 4 extends for at least a substantially greater part outside the outer casing.

Figure 1B:
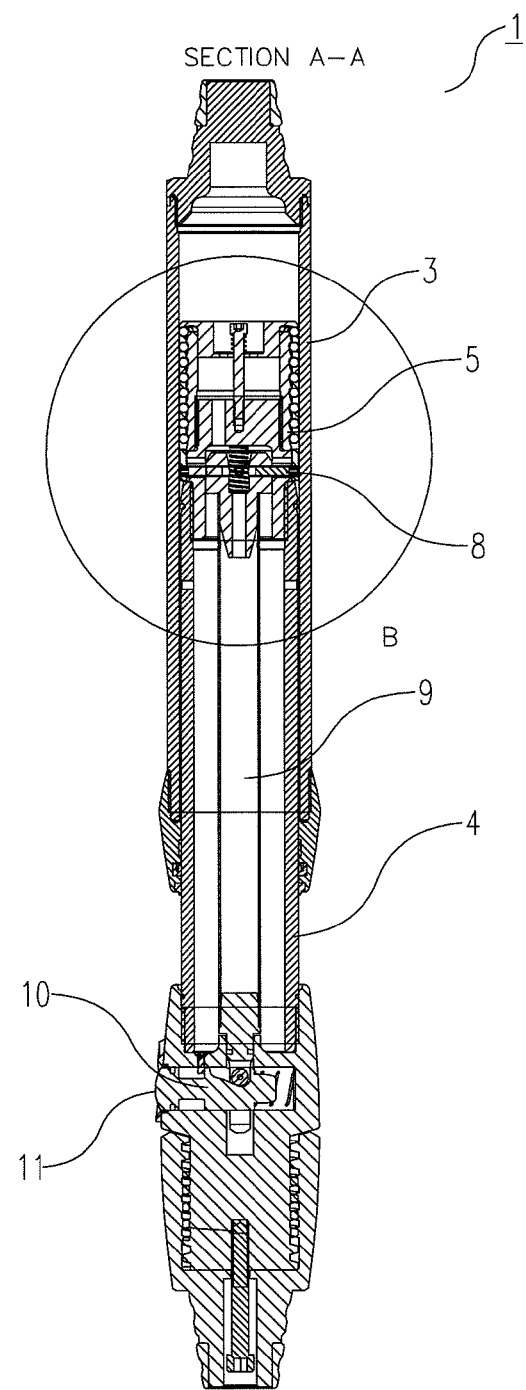
FIG. 1B is a front view of a cross-section of the safety device along the line A-A shown in FIG. 1A.

As shown in FIG. 1B in a front view of a cross-section of the safety device along the line A-A shown in FIG. 1A, piston rod 4 comprises close to an outer end inside outer casing 3 an extension bush 5 provided on a main surface facing toward the space with a number of successive radial grooves 6. Provided in grooves 6 are a number of blocking bodies 7 which are able and adapted to fix piston rod 4 and outer casing 3 of cylinder 2 relative to each other in the at least one extended position, wherein a movement of the piston rod into the outer casing is prevented. Although use is made in this exemplary embodiment of a number of successive radial grooves, it is also possible to make use of for instance one helical groove, or not use grooves at all but for instance separate recesses per blocking body. In order to reset cylinder 2 from an extended position to a less far extended position or the relatively compact starting position, a drive member 8 is provided inside the space in the form of a drive ring which is able and adapted to drive blocking bodies 7 into a deeper part of grooves 6 in order to release the blocking. For control of drive member 8 the piston rod 4 comprises over at least substantially the full length thereof an axial cavity in which a drive rod 9 is provided which is connected with a first outer end to drive member 8 inside outer casing 3 to enable driving of blocking bodies 7 therewith. At an opposite second outer end the drive rod 9 connects to a push shaft 10 which can be operated manually from outside by means of a control button 11 in order to displace the drive rod in axial direction. Drive rod 9 and/or the drive member can however be driven mechanically, pneumatically as well as hydraulically.

Figure 1C:
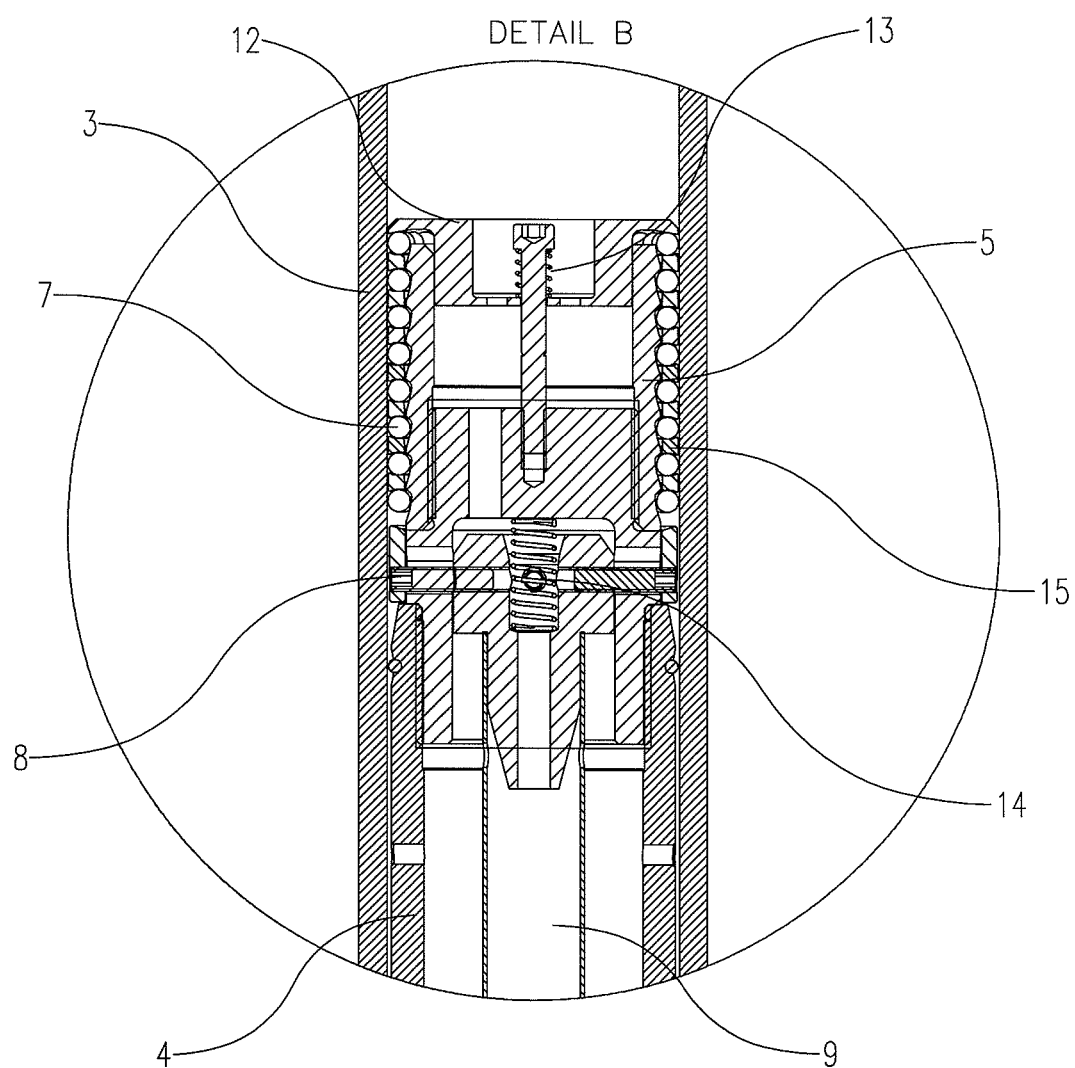
FIG. 1C is a detail view of the part of the cross-section shown in FIG. 1B indicated with circle B.
Figure 1D:
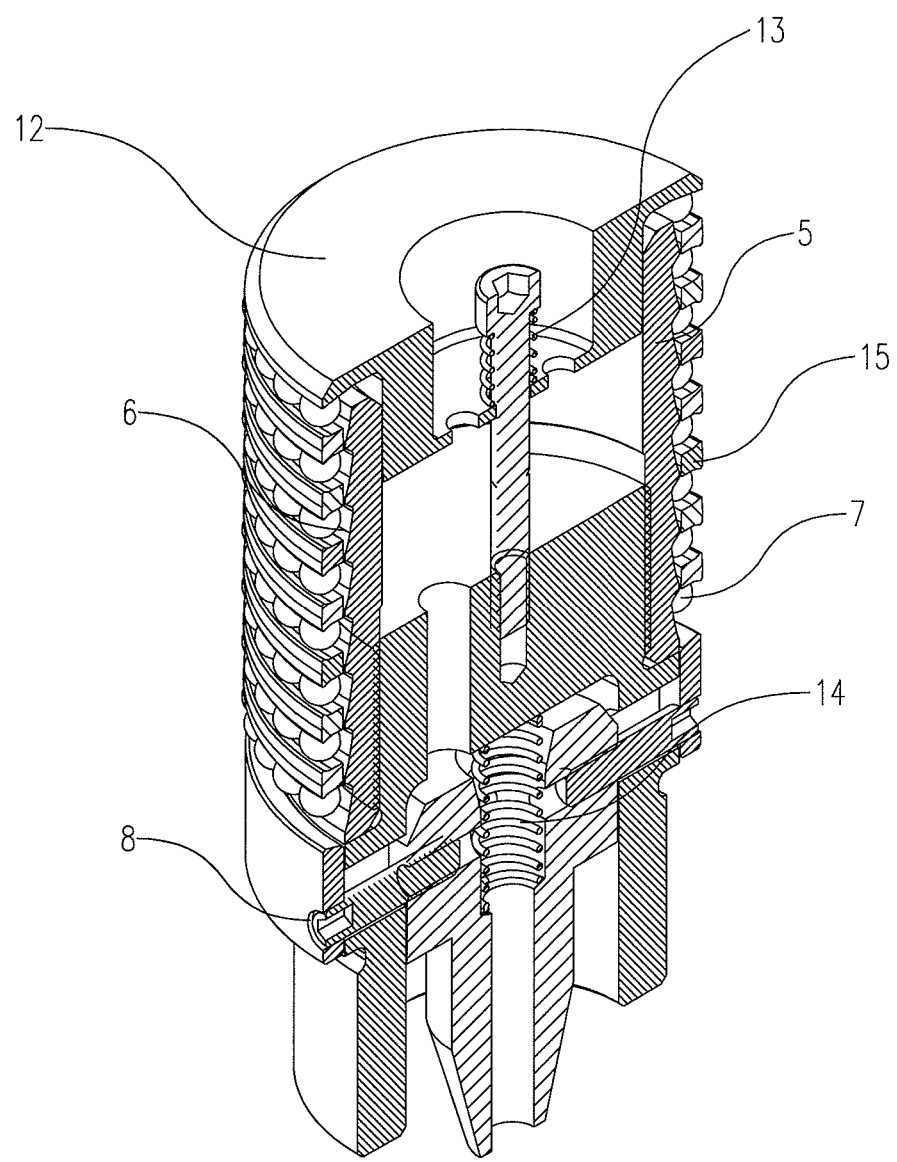
FIG. 1D is a perspective view of the part of the cross-section shown in FIG. 1C.

As shown in more detail in FIGS. 1C and 1D, blocking bodies 7 are spherical balls. Balls 7 can be manufactured from any material suitable for this purpose, but for reasons of durability are particularly of a hard material such as for instance steel. Grooves 6 in the main surface of the preferably also hardened steel extension bush 5 gradually increase in depth, wherein a maximum depth in grooves 6 is at least substantially adapted to a diameter of balls 7, so that balls 7, when placed in a deepest part of grooves 6, make at least substantially no or negligible contact with a main surface of outer casing 3 facing toward the space. Outer casing 3 and piston rod 4 can thus be freely adjusted when balls 7 are driven into a deepest part of grooves 6. Balls 7 can on one hand be driven by means of drive rod 9, as described above with reference to FIG. 1B. An axial displacement of drive rod 9 here provides for operation of drive member 8 which subsequently urges blocking bodies 7 out of a clamped position between outer casing 3 and extension bush 5 into a deeper part of grooves 6. This therefore releases the blocking. As long as drive rod 9 and drive member 8 urge blocking means 7 into a deeper part of the grooves, cylinder 2 can be reset to a more compact form. Drive rod 9 and/or drive member 8 can be driven manually here via control button 11 or hydraulically and/or pneumatically instead. In order to enhance subsequent automatic return of drive rod 9 and/or drive member 8 to a starting position following an axial displacement, drive rod 9 and drive member 8 are mounted via a spring 14. Balls 7 can on the other hand also be driven into a deeper part of grooves 6 by extending piston rod 4 relative to outer casing 3. Balls 7 here follow a path of least resistance and thus move out of the clamping position into a deeper part of grooves 6. According to the present invention a safety device, in particular a safety strut, is thus provided which can be set directly to an extended position without the fixation means first having to be temporarily removed for this purpose. This in contrast to the prior art in which the fixation pins do indeed first have to be taken out of the opening before the extending part can be set to a further extended position.

During a reverse movement of the piston into the outer casing the balls are driven directly into a shallower part of their respective groove between the piston rod and the outer casing. The grooves define an inclining wall in the main surface of extension bush 5, this inclining wall functioning as it were as a wedge urging the balls to a main surface of outer casing 3 facing toward the space. Balls 7 herein make contact with the main surface of outer casing 3 and exert a frictional resistance thereon. In the extended position cylinder 2 is thus blocked against unintended movement to the starting position. In order to hold balls 7 with certainty in the blocking position, a pushing body 12 is provided inside the space. Pushing body 12 is pushed permanently by means of a biased spring 13 against a first row of balls lying closest to pushing body 12, wherein the balls are held in a blocking position. Provided between the first row of balls and each successive row of balls in the successive grooves 6 is a connecting body 15 which mutually connects the balls. Connecting bodies 15 ensure that, when the first row of balls is driven by pushing body 12 into the blocking position, the successive rows of balls in the successive radial grooves are also driven at least substantially simultaneously into the blocking position. Conversely, all balls 7 are driven by connecting bodies 15 at least substantially simultaneously out of the blocking position into a deeper part of their respective grooves when a row of balls lying closest to drive member 8 is driven by the drive member. Balls 7 can only be driven out of the blocking position by exerting a force thereon, for instance by means of pushing member 8, which is greater than a spring tension in spring 13. The safety device according to the present invention can hereby moreover be applied in any position whatever, wherein both outer ends can be directed downward.

Although the invention has been further elucidated with reference to only a single exemplary embodiment, it will be apparent that the invention is by no means limited thereto. On the contrary, many other variations and embodiments are possible within the scope of the invention for the person with ordinary skill in the art. The telescopic tubular body is thus described in the form of a cylinder of round cross-section, but use can also be made of a tubular body of a more angular cross-section. Instead of the grooves on an outer side of the extending part, wherein the outer casing can take an at least substantially smooth form on an inner side, use can also be made of an outer casing with the grooves on an inner side, wherein it is then the extending part which can take an at least substantially smooth form.

The invention claimed is:

1. A safety device that is a safety strut, comprising:
    a drive rod;
    a telescopic tubular body of the safety strut with an axial space which is bounded by an outer casing and through which an extending part is axially movable, the extending part having an axial cavity in which the drive rod is disposed, the tubular body being adjustable between a relatively compact starting position in which the extending part is located at least substantially wholly inside the outer casing, and at least one extended position in which the extending part extends for at least a substantially greater part outside the outer casing; and
    a fixation system configured to fix the extending part and the outer casing relative to each other in the at least one extended position, the fixation system comprising at least one blocking body which is provided in the axial space between the outer casing and the extending part in a recess gradually increasing in depth in an axial direction on a main surface adjoining the axial space,
    wherein in the at least one extended position, the at least one blocking body clamps in a shallow part of the recess between a main surface of the outer casing and a main surface of the extending part in order to block movement of the extending part into the axial space inside the outer casing,
    wherein the drive rod is coupled at an outer end close to the at least one blocking body to a drive member which is configured to drive the at least one blocking body out of the shallow part of the recess into a deeper part of the recess to enable free setting of the outer casing and the extending part relative to each other.

2. The safety device as claimed in claim 1, wherein the at least one blocking body comprises a curved round side, and is a spherical body or a cylindrical body.

3. The safety device as claimed in claim 1, wherein the recess deepens at an angle of between at least substantially 1 degree and at least substantially 45 degrees relative to the main surface adjoining the axial space.

4. The safety device as claimed in claim 1, wherein the recess is provided on an outer side of the extending part facing toward the axial space.

5. The safety device as claimed in claim 4, wherein the extending part is provided with the recess at least close to an outer end inside the axial space.

6. The safety device as claimed in claim 1, wherein the recess is a groove which extends radially and in which a plurality number of blocking bodies are provided all around.

7. The safety device as claimed in claim 6, further comprising a plurality number of successive grooves in the axial direction in which a plurality number of additional blocking bodies are provided.

8. The safety device as claimed in claim 7, wherein a connecting body is provided between the plurality of successive blocking bodies in the plurality of successive grooves, the connecting body connecting the plurality of blocking bodies in the plurality of successive grooves to each other.

9. The safety device as claimed in claim 1, further comprising a pushing body inside the axial space, the pushing body configured to push the at least one blocking body under spring tension into the shallow part of the recess.

10. The safety device as claimed in claim 1, wherein the tubular body is configured to be adjusted manually, hydraulically and/or pneumatically between the starting position and the at least one extended position.

11. The safety device as claimed in claim 1, wherein the axial space inside the tubular body is at least substantially dirt and dust-tight.

12. The safety device as claimed in claim 2, wherein the recess deepens at an angle of between at least substantially 1 degree and at least substantially 45 degrees relative to the main surface adjoining the space.

\* \* \* \* \*